US006831290B2

(12) United States Patent
Mentzer

(10) Patent No.: US 6,831,290 B2
(45) Date of Patent: Dec. 14, 2004

(54) ELECTRO-OPTIC FLUID QUANTITY MEASUREMENT SYSTEM

(75) Inventor: Mark A. Mentzer, Lititz, PA (US)

(73) Assignee: Strube, Inc., Marietta, PA (US)

( * ) Notice: Subject to any disclaimer, the term of this patent is extended or adjusted under 35 U.S.C. 154(b) by 0 days.

(21) Appl. No.: 10/678,713

(22) Filed: Oct. 3, 2003

(65) Prior Publication Data

US 2004/0119037 A1 Jun. 24, 2004

Related U.S. Application Data

(63) Continuation of application No. 10/195,976, filed on Jul. 16, 2002, now abandoned.

(51) Int. Cl.[7] .................. G01N 15/06; G01N 21/49; G01N 21/85
(52) U.S. Cl. .............. 250/577; 250/227.14; 250/227.25
(58) Field of Search ................... 250/577, 573, 250/227.11, 227.14, 227.18, 227.21, 227.23, 227.24, 227.25, 900–908; 385/12, 141–145

(56) References Cited

U.S. PATENT DOCUMENTS

| 4,650,992 A | 3/1987 | Ruhrmann | 250/577 |
|---|---|---|---|
| 4,727,247 A | 2/1988 | Johnston | 250/577 |
| 4,870,292 A | 9/1989 | Alpert et al. | 250/577 |
| 4,880,971 A | 11/1989 | Danisch | 340/619 |
| 4,942,306 A | 7/1990 | Colbourne | 250/577 |
| 4,994,382 A | 2/1991 | Ameyama et al. | 250/577 |
| 5,164,608 A | 11/1992 | Vali et al. | 250/577 |
| H1364 H | 10/1994 | Toeppen | 250/577 |
| 5,804,831 A | 9/1998 | Romatzick | 250/577 |
| 6,172,377 B1 | 1/2001 | Weiss | 250/577 |
| 6,398,382 B1 | 6/2002 | Boyce et al. | 362/101 |

OTHER PUBLICATIONS

Weiss, J.D., "Fluorescent Optical Liquid–Level Sensor", Opt. Eng, Aug. 2000, 39(8), 2198–2213.

Primary Examiner—Thanh X. Luu
Assistant Examiner—Seung C. Sohn
(74) Attorney, Agent, or Firm—Woodcock Washburn LLP

(57) ABSTRACT

A preferred embodiment of a system for measuring a level of a fluid comprises a light source adapted to generate light having a predetermined wavelength, an optical waveguide slab at least partially filled with a material adapted to fluoresce when illuminated by the light having a predetermined wavelength, and a light pipe. The light pipe is adapted to transmit the light having a predetermined wavelength to the optical waveguide slab at an angle that causes the light to be internally reflected only within a portion of the optical waveguide slab located above the fluid thereby illuminating the fluorescent material within the portion of the optical waveguide slab located above the fluid. The preferred embodiment also comprises a photo-multiplier tube adapted to generate an electrical output in response to the fluorescence of the fluorescent material.

35 Claims, 9 Drawing Sheets

ELECTRO-OPTIC FLUID QUANTITY MEASUREMENT SYSTEM

CROSS REFERENCE TO RELATED APPLICATION

This application is a continuation of application No. 10/195,976 filed Jul. 16, 2002, which is now abandoned.

FIELD OF THE INVENTION

The present invention relates to a system for measuring the level of a fluid in an enclosed or semi-enclosed volume.

BACKGROUND OF THE INVENTION

A need to continuously measure the level of a fluid in an enclosed, or semi-enclosed volume exists in numerous commercial and military applications. For example, fluid-level sensors are commonly used to monitor fluid levels in aircraft, automobiles, and trucks. Fluid-level sensors are also used to monitor fluid levels within tanks utilized for fuel dispensing, wastewater treatment, chemical storage, food processing, etc.

Electrical fluid-level sensors present safety-related issues in many applications. For example, electrical fluid-level sensors have the potential to generate sparks, and thus present an explosion hazard when used in the presence of flammable fluids. Moreover, electromagnetic interference can, in some cases, corrupt or overwhelm the signals generated by and relied upon by electrical fluid-level sensors.

Electrical fluid-level sensors commonly rely on a float mechanically or magnetically coupled to an external gauge. Alternatively, electrical fluid-level sensors can operate on the principal that the dielectric constant between a pair of wires immersed or partially immersed in a fluid changes with the fluid level. This type of sensor, however, when used to detect fuel levels, loses accuracy as the amount of contaminants, e.g., water, in the fuel increases.

The use of optical sensors to measure fluid levels in enclosed or semi-enclosed volumes has been disclosed. For example, U.S. Pat. No. 6,172,377 (Weiss), which is incorporated by reference herein in its entirety, discloses an optical fluid-level sensor comprising an optical waveguide slab. The waveguide slab includes a transparent or semi-transparent sensing rod 46 having a doping material sealed therein. The doping material, when excited by light of a first wavelength, fluoresces and emits light at a second, longer wavelength. The waveguide slab is adapted to be placed in a tank holding a volume of fluid, and is partially immersed in the fluid.

The waveguide slab is in optical communication with a light source located outside of the tank. The light source emits light at the first wavelength (hereinafter referred to as "input light"). The input light is transmitted into the waveguide slab by a bundle of optical fibers. The light is directed into the waveguide slab at an angle (hereinafter referred to as the "input angle") that causes the light to be internally reflected within the portion of the waveguide slab located above an air-fluid interface in the tank. (The desired input angle is thus a function of the index of refraction of the air surrounding the waveguide slab.) (The tern "in optical communication," as used throughout the specification and claims with respect to two or more components, denotes a relationship in which optical signals can pass between the components, regardless of whether the components are physically joined or connected.)

The input light excites the doping material located above the air-fluid interface, and thereby causes the doping material to fluoresce, i.e., to emit light at the second wavelength (hereinafter referred to as the "output light").

The waveguide slab is in optical communication with a silicon photodetector located outside of the tank. The output light is transmitted to the photodetector via a bundle of optical fibers. The photodetector generates an electrical output that is proportional to the intensity of the output light incident thereon.

The input light is travels downward through the waveguide in a zigzag pattern, and eventually reaches a location below the air-fluid interface. The input angle is chosen so that the refractive index of the fluid inhibits the internal reflection of the input light below the air-fluid interface. More particularly, the refractive index of the fluid, in conjunction with the angle at which the reflected input light strikes to interior surfaces of the waveguide, causes the input light to be transmitted out of the waveguide and into the fluid when the input light reaches the air-fluid interface. Thus, the doping material located below the air-fluid interface does not substantially fluoresce. The amount of output light reaching the silicon photodetector is therefore related to, and can be correlated with, the location of the air-fluid interface.

Optical fluid-level sensors provide substantial advantages in relation to other types of fluid-level sensors such as electrical sensors. For example, optical sensors do not require the use of electrical signals within the fluid-containing volume. Hence, optical sensors do not introduce an explosion hazard when used in conjunction with flammable fluids. Moreover, optical sensors are usually immune to the effects of electromagnetic interference, have few (if any) moving parts, and operate on relatively low amounts of power.

Fluid-level sensors are often required in space-limited applications, e.g., for fuel-level measurements in aircraft The fluid-level sensor disclosed in Weiss, while providing the substantial advantages associated with optical sensors, may not be suitable for many space-limited applications.

For example, the Weiss sensor relies on bundles of optical fibers to convey light to and from the waveguide slab. This arrangement requires that the light source and the silicon photodetector be spaced apart from the waveguide slab by a sufficient distance to avoid bending the optical fibers beyond their minimum bending radii. The need to accommodate one or more bundles of optical fibers without exceeding the minimum bending radii thereof can preclude the use of an optical fluid level sensor in certain space-limited applications. Moreover, reducing the number of optical fibers can diminish the amount of light reaching the silicon photodetector to unusable levels.

Consequently, a need exists for an optical fluid-level sensor suitable for use in space-limited applications.

SUMMARY OF THE INVENTION

A preferred embodiment of a system for measuring a level of a first fluid in a volume adapted to hold the first fluid and a second fluid located substantially above the first fluid and having a refractive index different than a refractive index of the first fluid comprises a light source adapted to produce light of a first wavelength, and an elongated optical waveguide slab in optical communication with the light source and adapted to be immersed in the first and second fluids. The optical waveguide slab comprises a material adapted to emit light of a second wavelength when exposed to the light of the first wavelength, and has a reflective surface oriented at an acute angle in relation of a longitudinal axis of the optical waveguide slab.

The preferred embodiment also comprises a waveguide housing mechanically coupled to the optical waveguide slab and being adapted to direct the light of the first wavelength into the optical waveguide slab at a selectively-variable angle so that a substantial entirety of the light of the first wavelength is internally reflected within a portion of the optical waveguide slab located above the interface of the first and second fluids, and a substantial entirety of the light of the first wavelength is transmitted into the first fluid from a portion of the optical waveguide located below the interface of the first and second fluids. The preferred embodiment further comprises a photo-multiplier tube optically communicating with the optical waveguide slab and adapted to generate an electrical output in response to the light having the second wavelength.

A preferred embodiment of a system for measuring a level of a fluid comprises a light source adapted to generate light having a predetermined wavelength, and an optical waveguide slab at least partially filled with a material adapted to fluoresce when illuminated by the light having a predetermined wavelength.

The preferred embodiment further comprises a first optical fiber in optical communication with the light source, a waveguide housing mechanically coupled to the first optical fiber, and a light pipe mounted in the waveguide housing and being in optical communication with the first optical fiber. The light pipe is adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid.

The preferred embodiment also comprises a second optical fiber mechanically coupled to the photo-multiplier tube and in optical communication with the optical waveguide slab, and a photo-multiplier tube in optical communication with the optical waveguide slab and adapted to generate an electrical output in response to the fluorescence of the fluorescent material.

Another preferred embodiment of a system for measuring a level of a fluid comprises a light source adapted to generate light having a predetermined wavelength, and an optical waveguide slab at least partially filled with a material adapted to fluoresce when illuminated by the light having a predetermined wavelength.

The preferred embodiment further comprises a first optical fiber in optical communication with the light source, a waveguide housing mechanically coupled to the first optical fiber, and a light pipe mounted in the waveguide housing and being in optical communication with the first optical fiber. The light pipe is adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid.

The preferred embodiment also comprises an optical detector in optical communication with the optical waveguide slab and adapted to generate an electrical output in response to the fluorescence of the fluorescent material. The waveguide housing is adapted to facilitate selective variation of a distance between ends of the first optical fiber and the optical waveguide slab.

A preferred embodiment of a system for measuring a level of a fluid in a collapsible tank having a top cover adapted to translate upwardly and downwardly in response to variations in the level of the fluid in the tank, and a base, comprises a light source adapted to generate light having a predetermined wavelength.

The preferred embodiment also comprises an optical waveguide slab at least partially filled with a material adapted to fluoresce when illuminated by the light having a predetermined wavelength. The optical waveguide is flexible and has a substantially serpentine configuration. The preferred embodiment further comprises a supporting structure for the optical waveguide slab. The supporting structure is mechanically coupled to the top cover and the base and is adapted to expand and contract in response to upward and downward movement of the top cover.

The preferred embodiment further comprises a first optical fiber in optical communication with the light source, a waveguide housing mechanically coupled to the first optical fiber, and a light pipe mounted in the waveguide housing and being in optical communication with the first optical fiber. The light pipe is adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid.

The preferred embodiment also comprises a second optical fiber mechanically coupled to the photo-multiplier tube and in optical communication with the optical waveguide slab, and an optical detector in optical communication with the optical waveguide slab and adapted to generate an electrical output in response to the fluorescence of the fluorescent material.

Another preferred embodiment of a system for measuring a level of a fluid in a collapsible tank having a top cover adapted to translate upwardly and downwardly in response to variations in the level of the fluid in the tank, and a base, comprises a light source adapted to generate light having a predetermined wavelength, and a flexible optical waveguide slab at least partially filled with a material adapted to fluoresce when illuminated by the light having a predetermined wavelength.

The preferred embodiment also comprises a negator spring mechanically coupled to the optical waveguide slab and the base and biasing the optical waveguide slab so that a portion of the optical waveguide slab between the negator spring and the top cover remains in tension as the top cover translates upwardly and downwardly.

The preferred embodiment further comprises a first optical fiber in optical communication with the light source, a waveguide housing mechanically coupled to the first optical fiber, and a light pipe mounted in the waveguide housing and being in optical communication with the first optical fiber. The light pipe is adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid.

The preferred embodiment further comprises a second optical fiber mechanically coupled to the photo-multiplier tube and in optical communication with the optical waveguide slab, and an optical detector in optical communication with the optical waveguide slab and adapted to generate an electrical output in response to the fluorescence of the fluorescent material.

BRIEF DESCRIPTION OF THE DRAWINGS

The foregoing summary, as well as the following detailed description of a preferred embodiment, is better understood when read in conjunction with the appended drawings. For the purpose of illustrating the invention, the drawings show an embodiment that is presently preferred The invention is not limited, however, to the specific instrumentalities disclosed in the drawings. In the drawings.

DESCRIPTION OF PREFERRED EMBODIMENTS

Figure 1:
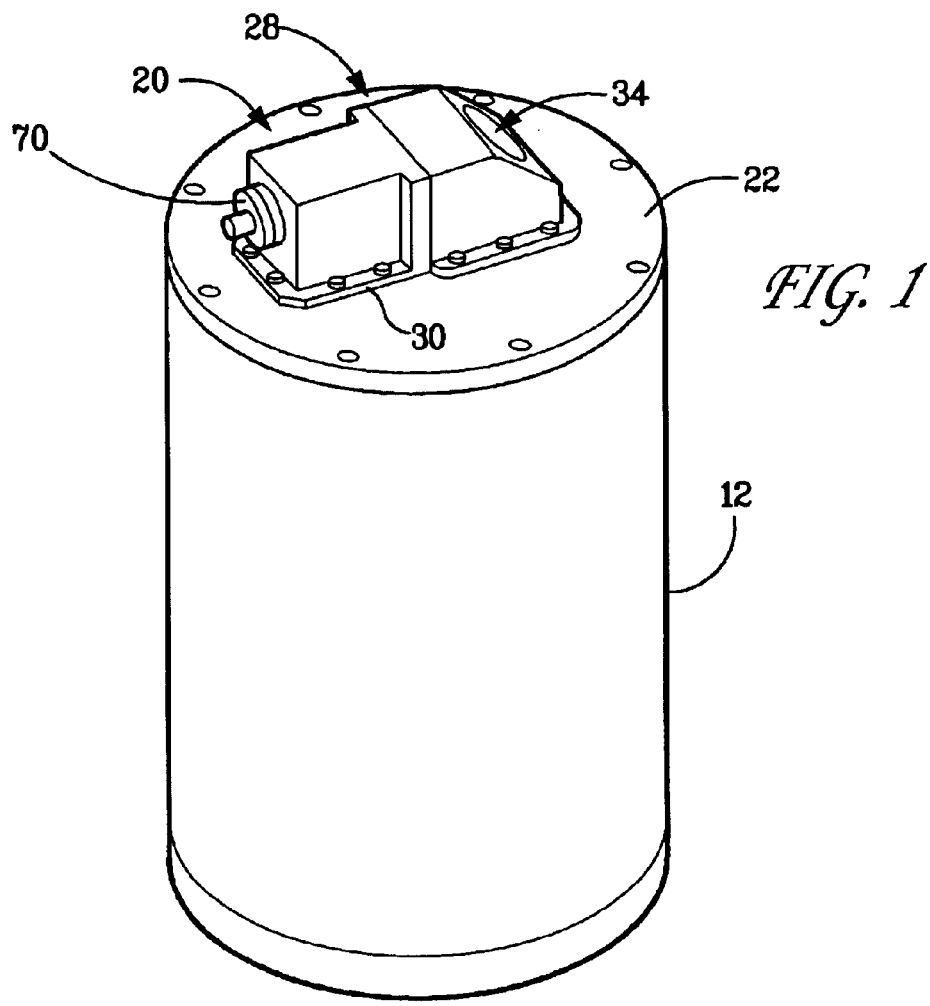
FIG. 1 is a perspective view of a housing assembly of a preferred embodiment of an electro-optic fluid quantity measurement system, installed on a mounting plate of a tank adapted to contain a volume of fluid.
Figure 2:
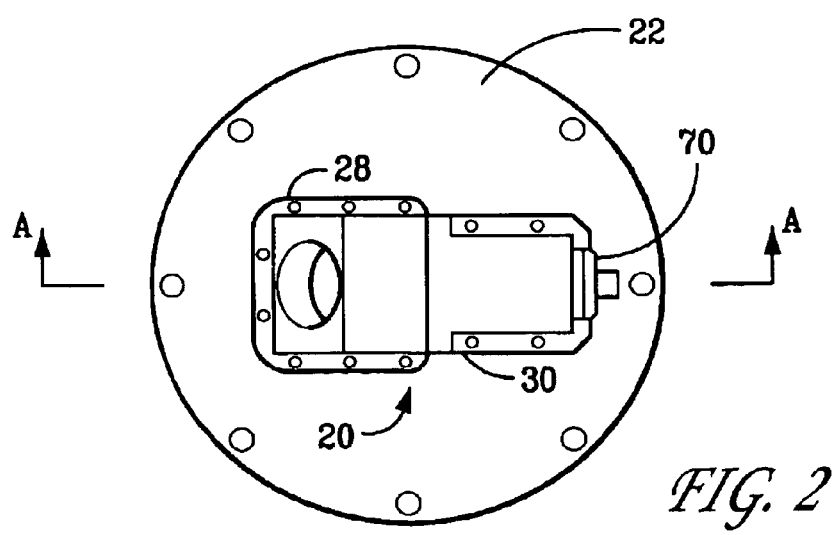
FIG. 2 is an upper view of the housing assembly and mounting plate depicted in FIG. 1.

A preferred embodiment of an electro-optic fluid quantity measurement system 10 is depicted in FIGS. 1 to 14. The system 10 comprises an optical waveguide slab 11. The waveguide slab 11 is adapted to be installed in a tank 12 adapted The tank 12 is adapted to hold a fluid 14 such as water, aviation gasoline, jet fuel (kerosene), etc. The volume of the tank 12 above the fluid 14 is filled with air 16. The interface between the air 16 and the fluid 14 is designated by the reference numeral 15. It should be noted that the details of the tank 12 depicted in the figures are presented for illustrative purposes only. The system 10 can be used in connection with tanks of virtually and size and shape, and with conformal as well as non-conformal tanks. Moreover, the volume above the fluid 14 can be filled with a fluid other than air.

Figure 3:
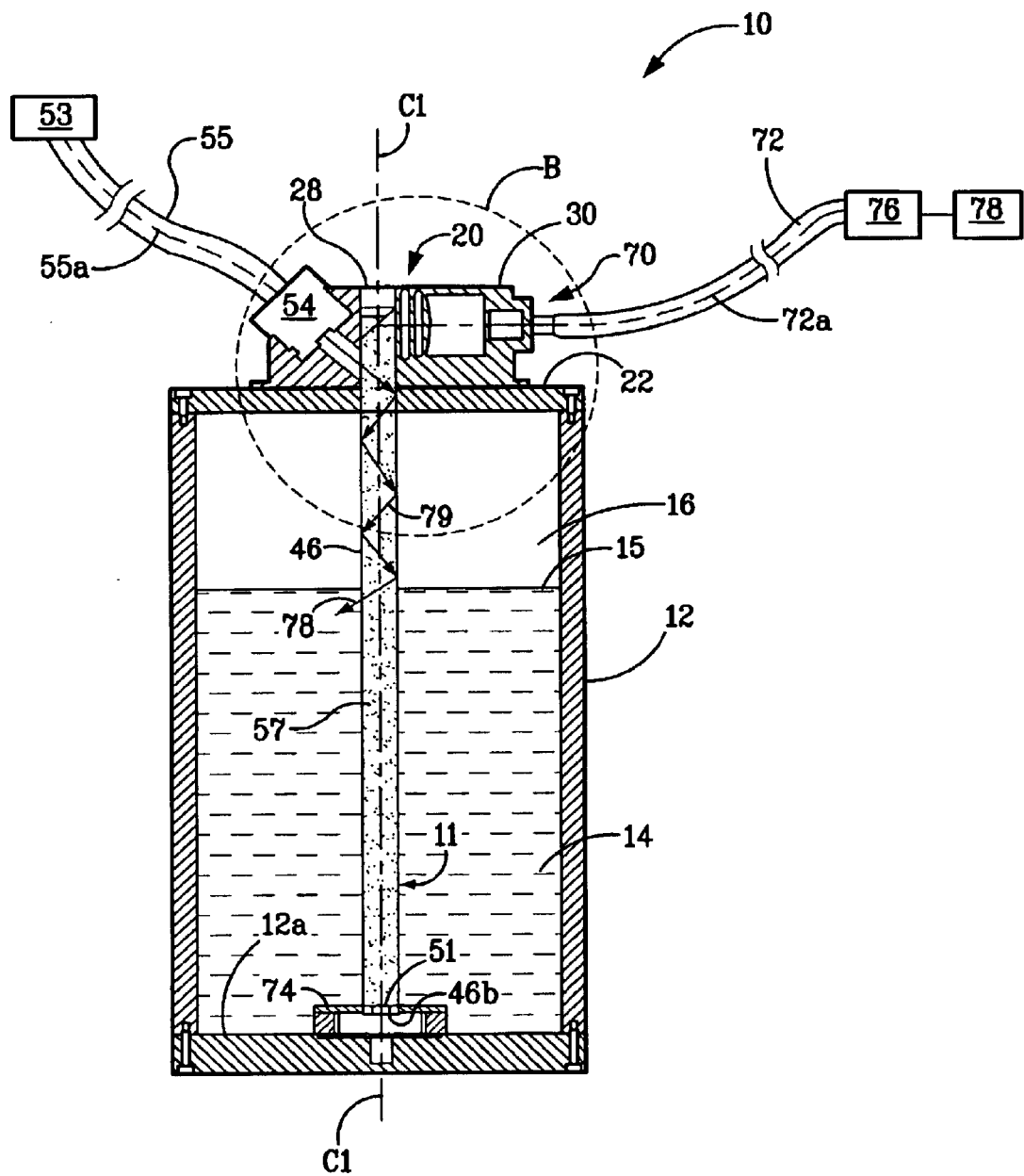
FIG. 3 is a cross-sectional view taken through the line "A—A" of FIG. 2 and further including a lighted-electronic diode, a photo-multiplier tube, and a signal processor of the electro-optic fluid quantity measurement system depicted in FIGS. 1 and 2.
Figure 4:
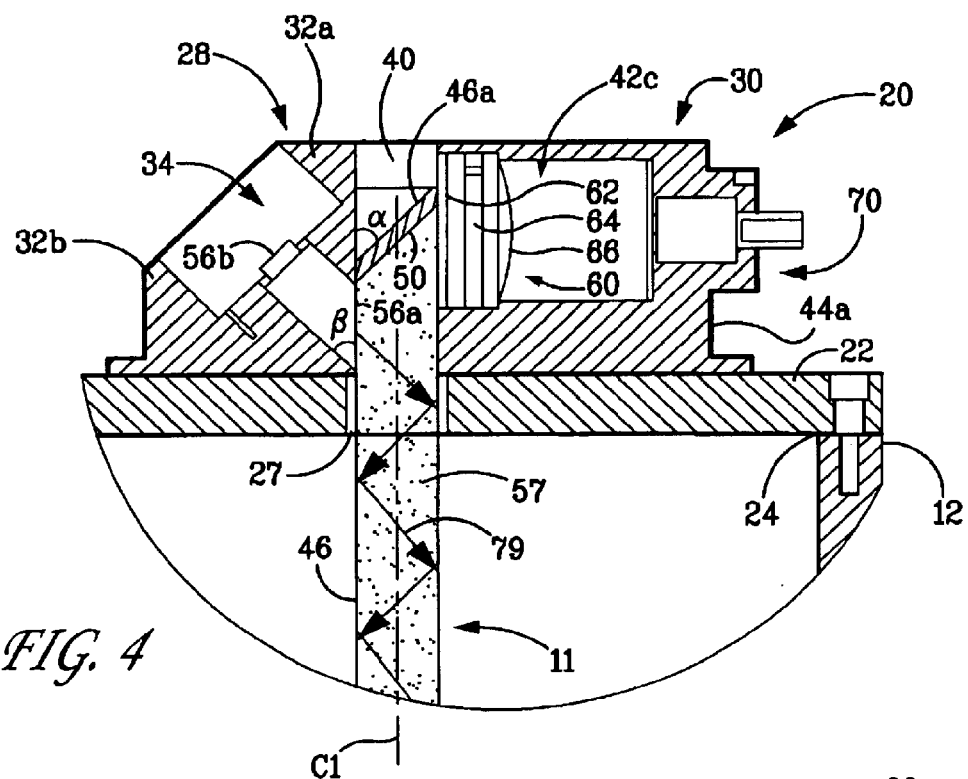
FIG. 4 is a magnified view of the area designated "B" in FIG. 3.
Figure 5:
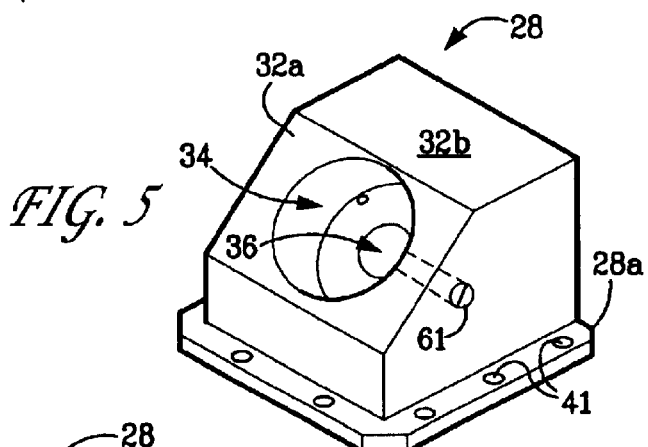
FIG. 5 is a perspective view of a waveguide housing of the electro-optic fluid quantity measurement system depicted in FIGS. 1–4.
Figure 6:
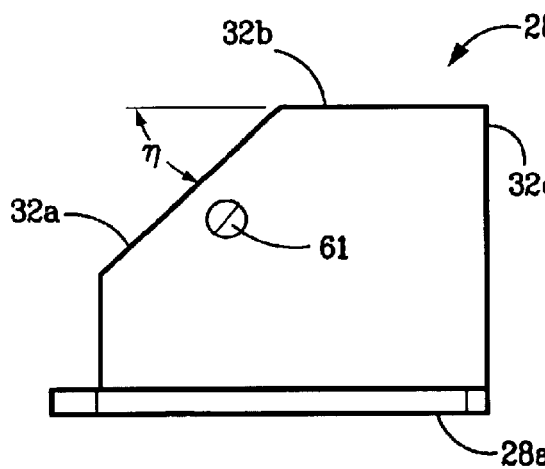
FIG. 6 is a side view of the waveguide housing depicted in FIG. 5.
Figure 7:
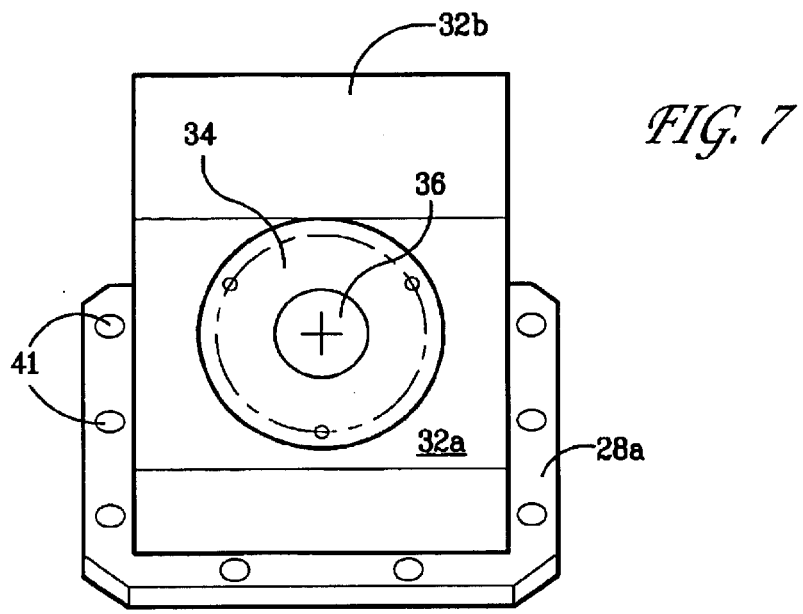
FIG. 7 is a top-side side view of the waveguide housing depicted in FIGS. 5 and 6.

The waveguide slab 11 comprises a sensing rod 46 (see FIGS. 3 and 4). The sensing rod 46 is formed from a transparent or semi-transparent material suitable for prolonged exposure to the fluid 14. For example, the sensing rod 46 may be formed from a suitable polymeric, glass, or composite material such as polymethylstyrene.

The sensing rod 46 is elongated, and has a centerline designated by the symbol "C1" in FIGS. 3 and 4. The sensing rod 46 preferably has a substantially rectangular cross section, and defines a sealed volume therein. A top panel 46a of the sensing rod 46 is beveled. More particularly, the top panel 46a is disposed at an acute angle in relation to the centerline "C1." This angle is designated "α" in FIG. 4. Preferably, the angle α is approximately 45 degrees. A first reflector (mirror) 50 is secured to an inner (lower) surface of the top panel 46a (see FIG. 4). Hence, the reflector 50 is oriented at an angle of approximately 45 degrees in relation to the centerline "C1." (It should be noted that directional terms such as "upper," "lower," "top," "bottom," etc. are used with reference to the component orientations depicted in FIG. 3. These terms are used for illustrative purposes only and, unless otherwise noted, are not intended to limit the scope of the appended claims.)

The sensing rod 46 also includes a bottom panel 46b (see FIG. 3). A second reflector (mirror) 53 is secured to an inner (upper) surface of the bottom panel 46b. (It should be noted that a reflective coating can be applied the inner surfaces of the top panel 46a and the bottom panel 46b in lieu of the mirrors 50, 52.)

The internal volume of the sensing rod 46 is uniformly filled with a doping impurity (doping material) 57. The doping material 57 may be, for example, an organic dye having the following characteristics. The doping material 57 fluoresces and emits electromagnetic radiation within the spectral range of green light (approximately 500 to 550 nm wavelength) when pumped (excited) by electromagnetic radiation within the spectral range of blue light (approximately 450–500 nm wavelength). In other words, the doping material 57 shifts the wavelength of blue light incident thereon by approximately 20 nm to approximately 40 nm.

The waveguide slab 11 is suspended from the housing assembly 20, as explained in detail below. The housing assembly 20 is mounted on a mounting plate 22 (see FIGS. 1–3). The mounting plate 22, in turn, is mounted on the tank 12. The mounting plate 22 has a through hole 27 formed therein to permit the waveguide slab 11 to pass through the mounting plate 22 and into the tank 12 (see FIG. 4). A seal is positioned in the through hole 27, between the mounting plate 22 and the waveguide slab 11 (the seal is not depicted in the figures, for clarity). A gasket 24 is positioned between the contacting surfaces of the tank 12 and the mounting plate 22 to inhibit leakage of the fluid 14 past the contacting surfaces.

The housing assembly 20 comprises a waveguide housing 28 and a lens housing 30. Structural details relating to the waveguide housing 28 and the lens housing 30 are as follows.

The waveguide housing 28 is depicted in detail in FIGS. 5–8. The waveguide housing 28 has an angled surface 32a. The angled surface 32a is preferably disposed at an angle of approximately 45 degrees in relation to an upper surface 32b of the waveguide housing 28 (this angle is denoted by the symbol "η" in FIG. 6).

A substantially circular bore 34 is formed in the waveguide housing 28, and extends inwardly from the angled surface 32a. A through hole 36 is also formed in the waveguide housing 28. The through hole 36 adjoins and extends inwardly from the bore 34. The bore 34 and the through hole 36 are substantially aligned, i.e., the respective centerlines of the bore 34 and the through hole 36 lie substantially along a common axis. Moreover, the centerlines of the bore 34 and the through hole 36 lie substantially perpendicular to the angled surface 32a, i.e., the bore 34 and the through hole 36 each extend in a direction substantially perpendicular to the angled surface 32a.

Figure 8:
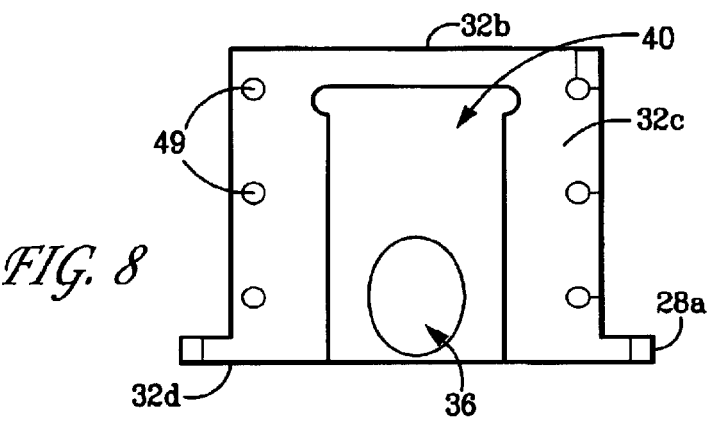
FIG. 8 is a side view of the waveguide housing depicted in FIGS. 5–7, rotated approximately ninety degrees from the perspective of FIG. 6.

A cavity 40 is formed in the waveguide housing 28 (see FIG. 8). The cavity 40 extends inwardly from a side surface 32c and a bottom surface 32d of the waveguide housing 28, and adjoins the through hole 36. The cavity 40 accommodates the waveguide slab 11. More particularly, the cavity 40 is sized so that an upper end of the sensing rod 46 fits within the cavity 40 with minimal clearance (see FIG. 4). The waveguide slab 11 is secured to the waveguide housing 28 by way of a clamp fixed to a lower surface of the mounting plate 22 and adapted to securely grasp the non-reflecting sides of the sensing rod 46, i.e., the sides of the sensing rod 46 that extend substantially parallel to the cross-section depicted in FIGS. 3 and 4. (The claim is not depicted in the figures, for clarity).

The waveguide housing 28 includes a flange portion 28a having a plurality of through holes 41 formed therein. The through holes 41 accommodate conventional fasteners that engage threaded holes formed in the mounting plate 22, thereby securing the waveguide housing 28 to the mounting plate 22.

Figure 9:
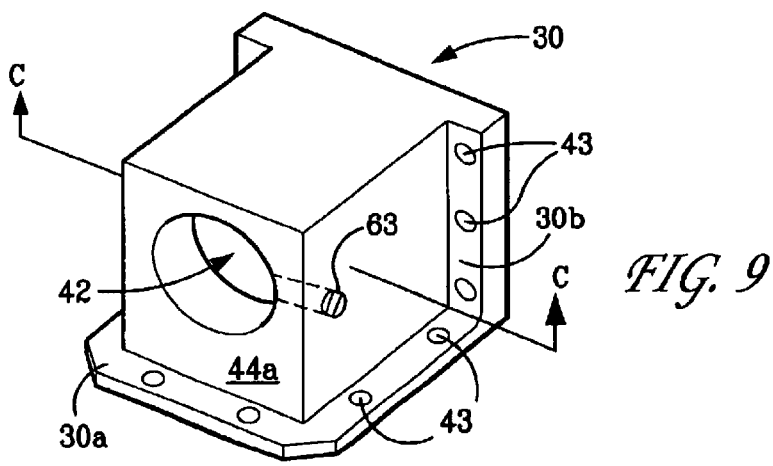
FIG. 9 is a perspective view of a lens housing of the electro-optic fluid quantity measurement system depicted in FIGS. 1–8.
Figure 10:
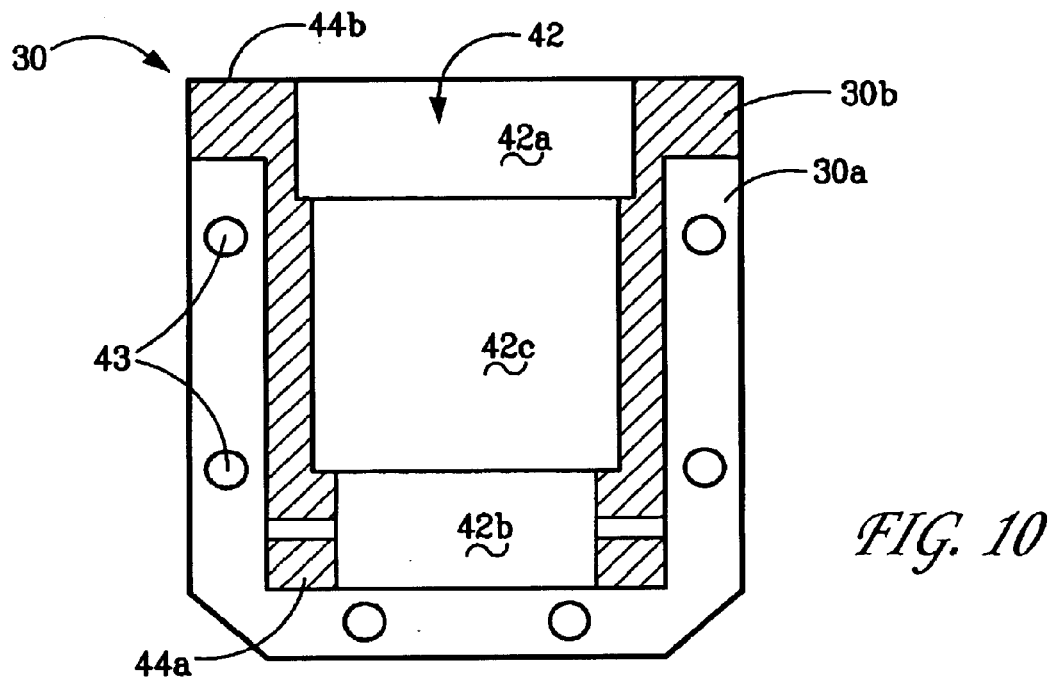
FIG. 10 is a cross-sectional view of the lens housing shown in FIG. 9, taken through the line "C—C" of FIG. 9.

The lens housing 30 has a passage 42 formed therein (see FIGS. 9 and 10). The passage 42 extends between a first side surface 44a and a second side surface 44b of the lens housing 30. A centerline of the passage 42 lies substantially perpendicular to the first and second side surfaces 44a, 44b, i.e., the passage 42 extends in a direction substantially perpendicular to the first and second side surfaces 44a, 44b. The passage 42 has a large-diameter portion 42a, a small-diameter portion 42b, and a middle portion 42c.

The second side surface 44b of the lens housing 30 abuts the side surface 32c of the waveguide housing 28 when the waveguide housing 28 and the lens housing 30 are installed on the mounting plate 22 (see FIG. 4). Moreover, the large-diameter portion 42a of the passage 42 adjoins the cavity 40 when the waveguide housing 28 and the lens housing 30 are installed on the mounting plate 22.

The lens housing 30 includes a first flange portion 30a and a second flange portion 30b each having a plurality of through holes 43 formed therein. The through holes 43 located on the first flange portion 30a accommodate conventional fasteners that engage threaded holes formed in the mounting plate 22, thereby securing the waveguide housing 28 to the mounting plate 22. The through holes 43 located on the second flange portion 30b accommodate conventional fasteners that engage threaded holes 49 formed in the waveguide housing 28, thereby securing the lens housing 30 to the waveguide housing 28.

Figure 13:
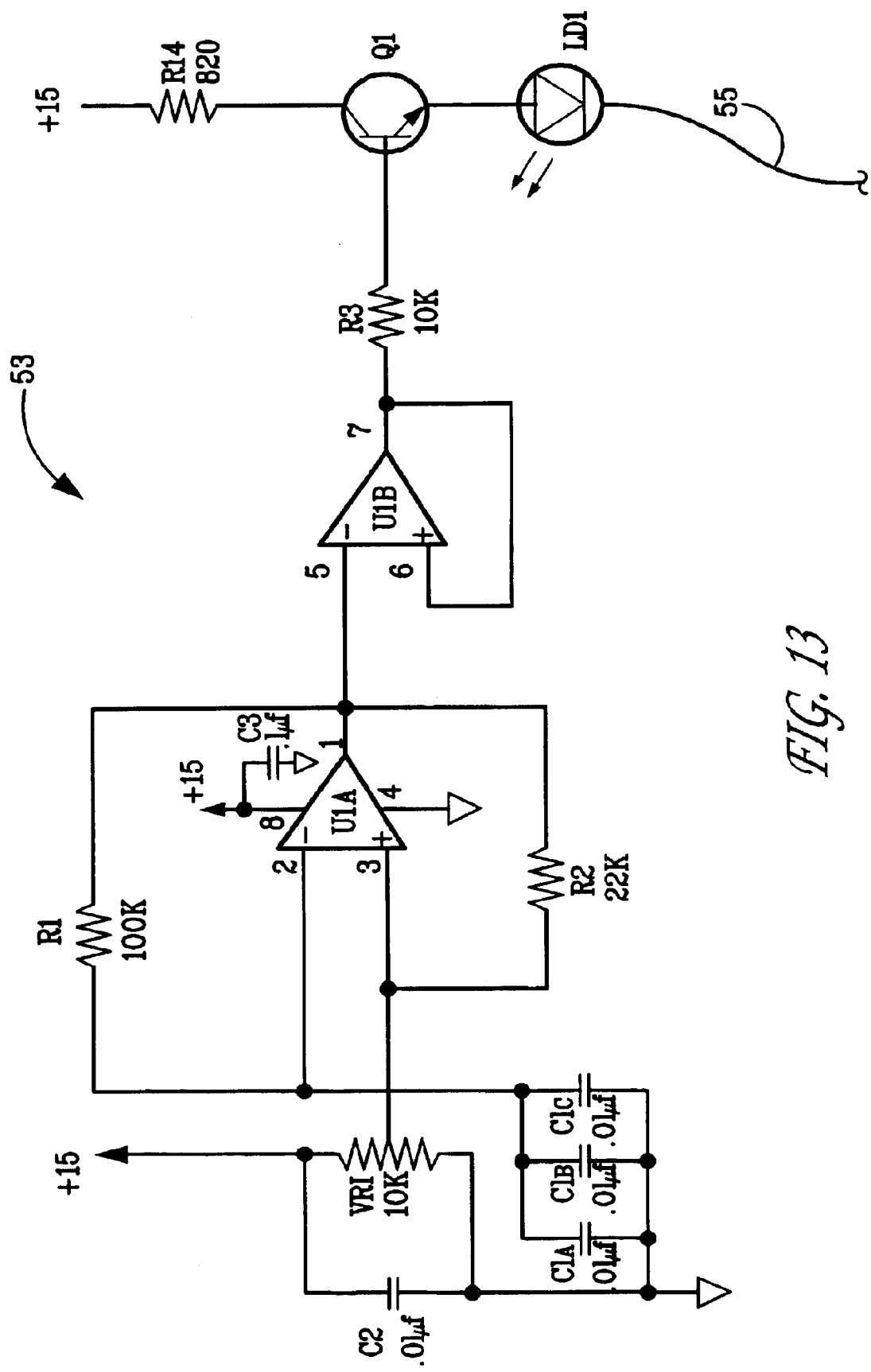
FIG. 13 is a schematic illustration of the lighted-electronic diode depicted in FIG. 3.

The system 10 further comprises a lighted electronic diode (LED) 53 (see FIGS. 3 and 13). The LED 53 preferably emits electromagnetic radiation that peaks at a wavelength of approximately 470 nm, i.e., within the spectral range of blue light (The LED 53 may be pulsed during operation of the system 10 to increase the output and extend the life of the LED 53.) The LED 53 is located entirely outside of the tank 12. Preferably, the LED 53 communicates optically with the waveguide slab 11 by way of a fiber optic cable 55. The fiber optic cable preferably comprises a single optical fiber 55a. The light generated by the LED 53 is transmitted to the waveguide slab 11 by the fiber optic cable 55 and excites the doping material 57 within the waveguide slab 11, as explained in detail below.

It should be noted that the use of the LED 53 is disclosed for exemplary purposes only. Virtually any type of light source capable of emitting in the desired spectral range, e.g., an argon gas laser, can be used in lieu of the LED 53. Moreover, a specific peak emission wavelength for the LED 53 is specified for illustrative purposes only. The optimal peak wavelength is application-dependent, and will vary with factors such as the length of the waveguide slab 11, the concentration or density of the doping material 57, the light-absorption characteristics of the doping material 57, etc.

The fiber optic cable 55 is preferably a multi-mode cable having a high numerical aperture and a large-diameter core for maximal light-transmission. The fiber optic cable 55 has a collimating lens assembly 54 mechanically coupled thereto and in optical communication therewith. The bore 34 of the waveguide housing 28 is adapted to receive the collimating lens assembly 54. More particularly, an end portion of the collimating lens assembly 54 is sized to fit within the bore 34 with minimal clearance, thereby restraining the collimating lens assembly 54 (and the end of the fiber optic cable 55) from lateral movement, i.e., from movement perpendicular to a centerline of the bore 34.

The collimating lens assembly 54 is further secured to the waveguide housing 28 by a set screw 61 that prevents the collimating lens assembly 54 from backing out of the bore 34. The axial position of the collimating lens assembly 54, i.e., the position of the collimating lens assembly 54 along an axis corresponding to the centerlines of the bore 34 and the through hole 36, can be varied as necessary using the set screw 61.

It should be noted that the collimating lens assembly is disclosed for exemplary purposes only. Other types of terminations for the fiber optic cable 55, such as a SELFOC fiber assembly, can be used in lieu of the collimating lens assembly 54.

Figure 11:
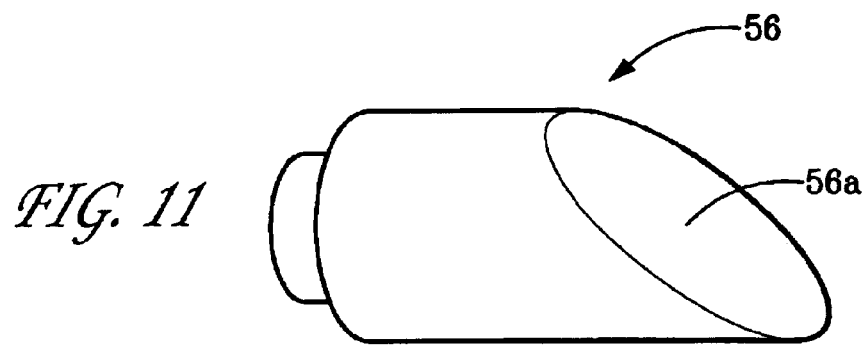
FIG. 11 is a perspective view of a light pipe of the electro-optic fluid quantity measurement system depicted in FIGS. 1–10.
Figure 12:
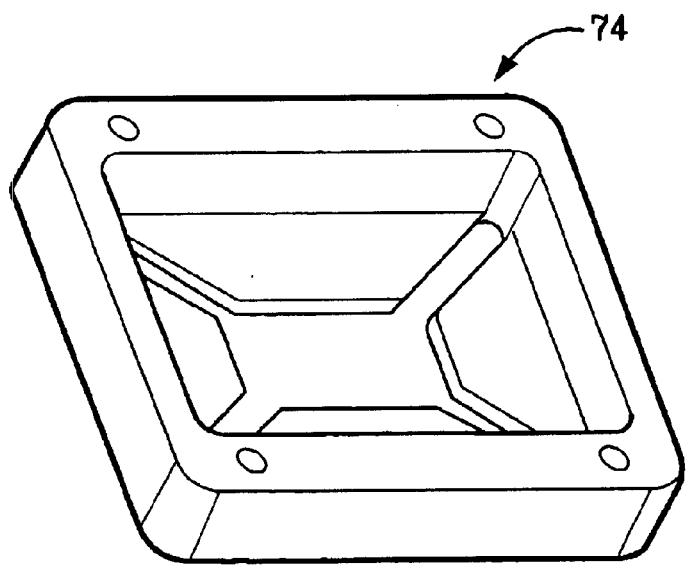
FIG. 12 is a perspective view of a snubber of the electro-optic fluid quantity measurement system depicted in FIGS. 1–11.

The through hole 36 in the waveguide housing 28 is adapted to receive a light pipe 56 (see FIGS. 4 and 11). More particularly, the light pipe 56 is sized to fit within the through hole 36 with minimal clearance. The light pipe 56 is optically bonded to the waveguide housing 28 using an index-matching epoxy or an optical gel. This arrangement substantially reduces wear on the light pipe 56.

The light pipe 56 has a first and a second transparent end surface 56a, 56b. The first end surface 56a is beveled, i.e., disposed at an acute angle in relation to a centerline of the light pipe 56 (this angle is denoted by the symbol "β" in FIG. 4). Preferably, the angle β is approximately 45 degrees. This feature causes the end 56a of the light pipe 56 to lie substantially flush with an end of the through hole 34. In other words, the light pipe 56 extends through an entirety of the through hole 34 without protruding substantially into the cavity 40, as depicted in FIG. 4.

The light pipe 56 is in optical communication with the collimating lens assembly 54. Hence, light generated by the LED 53 is transmitted through the optical fiber 55*a* of the fiber optic cable 55 to the collimating lens assembly 54, which collimates and focuses the light. The light subsequently passes through the light pipe 56 and into the waveguide slab 11.

The collimating lens assembly 54 is preferably oriented so as to cause the light to enter the waveguide slab 11 at an angle of approximately 45 degrees in relation to the centerline C1 of the waveguide slab 11. (It should be noted that this particular angle is specified for exemplary purposes only; the optimum angle is a function of the optical characteristics of the waveguide 11, and may therefore vary from the specified value in other applications.) Moreover, the axial position of the collimating lens assembly 54 can be adjusted using the set screw 61, as noted above. This feature facilitates maximal transmission of light between the collimating lens assembly 54 and the waveguide slab 11.

The system 10 further comprises a lens and filter assembly 60. The lens and filter assembly 60 is sized to fit within the large-diameter portion 42*a* of the passage 42 with minimal clearance (see FIG. 4). The lens and filter assembly 60 communicates optically with the mirror 50, as explained in detail below.

The lens and filter assembly 60 comprises a filter 62, a spacer and retaining ring 64, and a lens 66. The filter 62 is located adjacent the waveguide slab 11. The filter 62 is adapted to substantially block the passage of electromagnetic radiation outside of the spectral range of green light. In other words, the filter 62 is adapted to substantially block the passage of light having a wavelength outside of the range of approximately 500 to 550 nm.

The spacer and retaining ring 64 is positioned between the filter 62 and the lens 66. The spacer and retaining ring 64 is split The spacer and retaining ring 64 is sized to resiliently and securely engage the surrounding surface of the passage 42 when placed therein, thereby securing the lens 66 in position between the spacer and retaining ring 64 and a lip 68 formed in the lens housing 30. Functional details relating to the lens and filter assembly 60 are presented below.

The system 10 further comprises an output connector assembly 70, and a fiber optic cable 72 optically and mechanically coupled to the output connector assembly 70. The cable 72 preferably comprises a single optical fiber 72*a* The output connector assembly 70 is sized to fit within the small-diameter portion 42*b* of the passage 42 with minimal clearance (see FIG. 4). The output connector assembly 70 facilitates optical communication between the lens and filter assembly 60 and the optical fiber 72*a* of the fiber optic cable 72.

The output connector assembly 70 is secured to the lens housing 30 by a set screw 63 (see FIG. 9). The axial position of the output connector assembly 70, i.e., the position of the output connector assembly 70 along an axis corresponding to the centerline of the passage 42, can be varied as necessary using the set screw 63. This feature facilitates maximal transmission of light between the lens and filter assembly 60 and the optical fiber 72*a* of the fiber optic cable 72.

The fiber optic cable 72 is preferably a multi-mode cable having a high numerical aperture and a large-diameter core for maximal light-transmission.

The system 10 further comprises a photo multiplier tube ("PMT") 76. The PMT 76 is optically and mechanically coupled to the fiber optic cable 72, and is positioned entirely outside of the tank 14. The PMT 76 is adapted to generate an analog electrical output that is proportionate to the amount of light that reaches the PMT 76 via the optical fiber 72*a* of the fiber optic cable 72. (It should be noted that the PMT 76 is a preferred type of optical detector, other types of optical detectors can be used in lieu of the PMT 76.)

Figure 14:
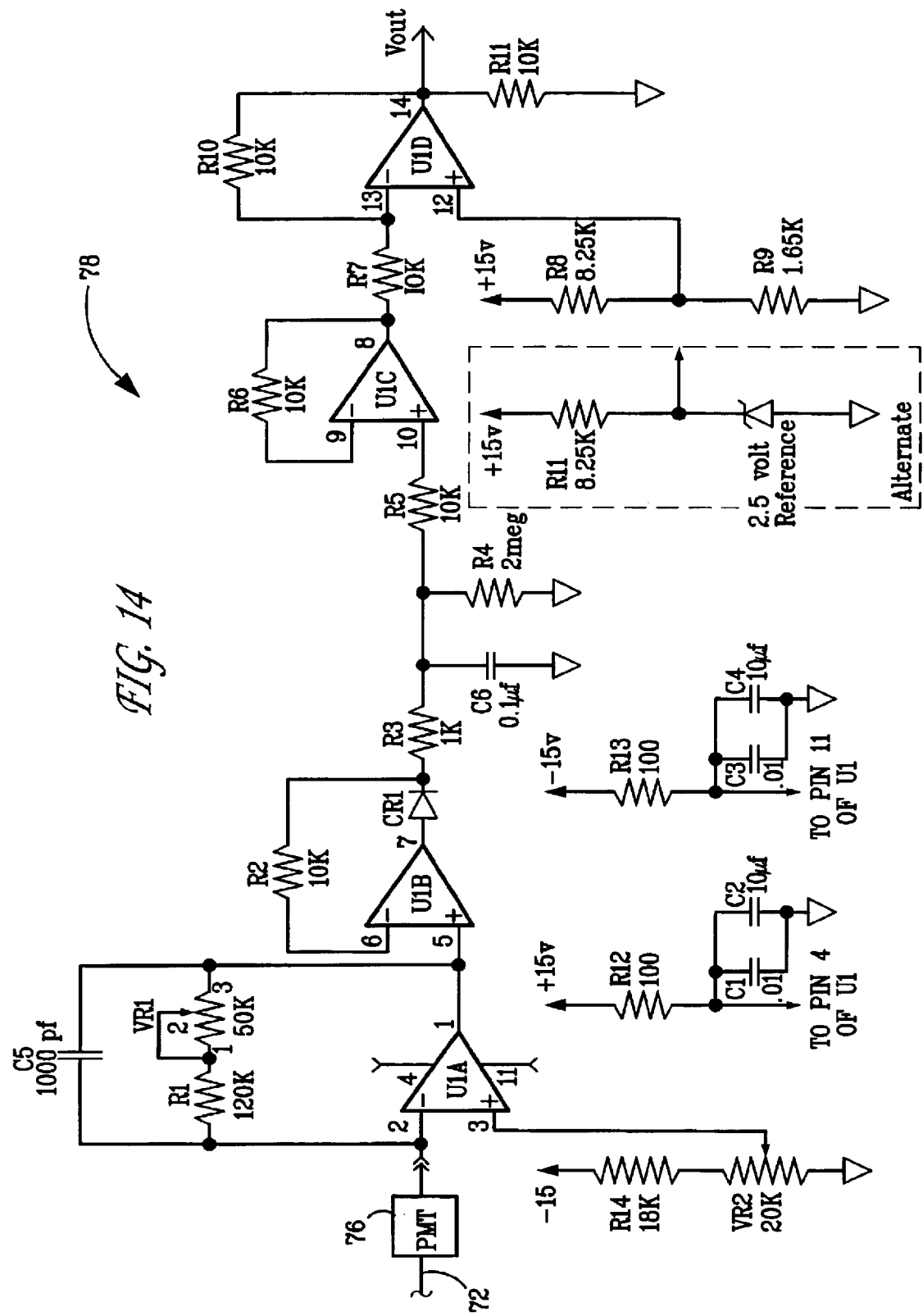
FIG. 14 is a schematic illustration of the signal processor depicted in FIG. 3.

The system 10 further comprises a signal processor 78 electrically coupled to the PMT 76 (see FIGS. 3 and 14). The signal processor 78 receives the output signal of the PMT 76, processes the output signal, and transmits the processed signal to a display device capable of providing an indication of the quantity of fluid 14 in the tank 12. For example, the processed signal may be displayed as a digital read-out showing the quantity of fluid in the tank 12 as a percentage of the total capacity of the tank 12, or in units such as gallons or liters.

The system 10 further comprises a dampener, or snubber 74 (see FIGS. 3 and 12) The snubber 74 is fixedly coupled to a base 12*a* of the tank 12. The snubber 74 is preferably formed from nylon (the snubber 74 can alternatively be formed from virtually any resilient material having suitable damping characteristics). The snubber 74 is adapted to receive a bottom end of the sensing rod 46. The snubber 74 acts as a dashpot that dampens vibration of the sensing rod 46 induced by sources external to the tank 12. It should be noted that alternative embodiments may include one or more additional dampeners similar to the snubber 74 and interspersed along the length of the sensing rod 46. For example, additional dampeners may be needed in applications where the required length of the sensing rod is substantially greater than that of the sensing rod 46.

Operational details relating to the system 10 are as follows. The LED 53 emits electromagnetic radiation that peaks within the spectral range of blue light, as noted previously (the electromagnetic radiation generated by the LED 53 is hereinafter referred to as "blue light," and is represented diagrammatically by the arrows 79 in FIGS. 3 and 4). The blue light is transmitted to the collimating lens assembly 54 by way of the optical fiber 55*a* of the fiber optic cable 55. The collimating lens assembly 54 focuses the blue light into the waveguide slab 11 by way of the light pipe 56.

The orientation of the collimating lens assembly 54 causes the blue light to enter the sensing rod 46 of the waveguide slab 11 at an angle of approximately 45 degrees in relation to the centerline C1 of the waveguide slab 11, as explained previously. This angle is greater that the critical angle, i.e., the angle above which substantially all of the blue light will be reflected from the internal surfaces of the sensing rod 46 located above the fluid-air interface 15. Notably, the critical angle at a particular vertical location on the waveguide 11 is a function of the refractive index of the fluid surrounding the waveguide 11 at that particular location.

The reflection of the blue light within the waveguide 11 appears to cause the blue light to scintillate, or bounce in a zigzag pattern, down the portion of the waveguide 11 located above the air-fluid interface 15, as depicted in FIGS. 3 and 4. In other words, the blue light is reflected back and forth between opposing internal surfaces of the sensing rod 46 at an angle of approximately 45 degrees.

The blue light, upon striking the doping material 57 within the sensing rod 46, is believed to excite, or "pump," the doping material 57, thereby causing the doping material 57 to emit electromagnetic radiation that peaks in the spectral range of green light (the electromagnetic radiation emitted by the doping material 57 hereinafter referred to as "green light").

The blue light does not appear to be reflected from the internal surfaces of the sensing rod 46 located below the air-fluid interface 15. In particular, the refractive index of the fluid 14 is greater than that of the air 16. Hence, the critical angle differs between the portions of the waveguide slab 11 located above and below the air-fluid interface 15. The 45-degree angle at which the blue light strikes the internal surfaces of the sensing rod 46 is lower than the critical angle for the portion of the waveguide slab 11 located below the air-fluid interface 15. Hence, the blue light striking the internal surfaces of the sensing rod 46 apparently is not reflected, but rather is transmitted out of the waveguide slab 11 and into the fluid 16. (It should be noted that the preferred 45-degree angle specified herein is the optimal angle when the fluid 14 is water, the preferred angle will vary with the type of fluid 14 stored in the tank 12.)

Most of the doping material 57 located below the air-fluid interface 15 does not appear to be excited by the blue light and does not fluoresce, i.e., does not emit electromagnetic radiation in the spectral range of green light, because most the blue light is transmitted out of the waveguide slab 11 upon reaching the air-fluid interface 15. Hence, the total amount of fluorescence, i.e., the total amount of green light generated in the waveguide slab 11, is related to, and can be correlated with, the location of the air-fluid interface 15. The location of the air-fluid interface 15, in turn, provides and indication of level of the fluid 16 within the tank 12.

A portion of the green light generated by the doping material 57 travels upward through the sensing rod 46, and eventually reaches the reflector 50. (The amount of light reaching the reflector 50 is believed to be increased by the reflector 51 located at the bottom of the sensing rod 46, which reflects, i.e., upwardly directs, a portion of the green light that initially travels downward within the waveguide slab 11.)

The reflector 50, as noted above, communicates optically with the lens and filter assembly 60. More particularly, the angled orientation of the reflector 50 reflects the green light incident thereon toward the filter 62 of the lens and filter assembly 60. In other words, the reflector 50 turns the green light by approximately 90 degrees.

The filter 62 substantially blocks the passage of electromagnetic radiation outside of the spectral range of green light. (Hence, the filter 62 substantially blocks the passage of any residual blue light that reaches the filter 62.) The green light that passes through the filter 62 is focused toward the output connector assembly 70 and the fiber optic cable 72 by the lens 66. The optical fiber 72a of the fiber optic cable 72 transmits the green light to the PMT 76.

The PMT 76, upon receiving the green light, generates an analog electrical signal that is representative of the intensity of the green light incident thereupon. The signal generated by the PMT 76 is transmitted to the signal processor 78, which processes and converts the signal into a form that can readily be displayed and identified as an indication of the quantity of the fluid 14 in the tank 12 (the processed signal is denoted by the term "$V_{OUT}$" in FIG. 14).

The PMT 76, as noted above, is a preferred type of optical detector. In particular, the PMT 76 has a substantially linear signal response over five decades of dynamic range. This characteristic permits the system 10 to be used over a wide range of applications, e.g., for small tanks, large tanks, tall and thin tanks, etc., without a need to modify or replace the signal processor 78 or the doping material 57.

Moreover, Applicants have found that the use of the PMT 76 permits the number of fiber optic cables 72 to be minimized, for the following reason. The PMT 76 is particularly well suited for applications in which the intensity of the input (light) signal is relatively low. More specifically, PMTs such as the PMT 76, in general, operate with a higher gain than other types of optical devices of similar capability. Hence, given an input signal of a particular intensity, the PMT 78 typically can generate an output signal having a substantially lower noise level than the output signals generated by other types of optical devices such as silicon photodetectors.

The high-gain, low-noise characteristics of the PMT 76 permit the PMT 76 to operate with relatively low levels of input light. In other words, the PMT 76 can generate an output signal having a relatively low noise level based on an input signal of relatively low intensity.

The intensity of the input signal to the PMT 76 is related to the number of fiber optic cables 72 that optically couple the PMT 76 and the signal processor 78. More particularly, lowering the number of fiber optic cables 72 between the PMT 76 and the signal processor 78, in general, lowers the intensity of the light reaching the PMT 76. The high-gain, low-noise characteristics of the PMT 76 allow the PMT 76 to function with a lower-intensity input signal and, thus, with a lower number of fiber optic cables 72, than other types of optical detectors such as PIN or APD photo diodes.

Moreover, design of the housing assembly 20 further minimizes the required number of fiber optic cables 72. In particular, the housing assembly 20 permits the axial and angular positions of the collimating lens assembly 54 to be adjusted in relation to the waveguide slab 11. Hence, the relative axial and angular positions of the collimating lens assembly 54 and the waveguide slab 11 can be optimized for maximal internal reflection of the blue light (and, thus, the amount of fluorescence) within the waveguide 11. This feature also permits the system 10 to be quickly reconfigured and optimized for use with different types of fluids 14.

Furthermore, the axial position of the output connector assembly 70 in relation to the mirror 50 can be adjusted to maximize the transmission of green light from the waveguide 11 to the fiber optic cable 72 and the PMT 76.

Thus, the noted design of the housing assembly 20, by maximizing the fluorescence within the waveguide 11 and the transmission of the resulting green light, minimizes the number of optical fibers 72a needed to optically couple the waveguide 11 to the PMT 78. Maximizing the fluorescence within the waveguide 11 and the transmission of the resulting green light also reduces the intensity of the blue light that must be input to the waveguide 11, and thereby minimizes the number of optical fibers 55a needed to optically couple the LED 53 and the waveguide 11. In fact, Applicants have demonstrated satisfactory operation of the system 10 using a single optical fiber 55a and a single optical fiber 72a.

Minimizing the number of optical fibers needed to conduct light between the LED 53 and the collimating lens assembly 54, and between the PMT 76 and the output connector assembly 70, can substantially reduce the amount of space needed to accommodate the system 10. More particularly, coupling the waveguide slab 11 to optical devices such as the PMT 78 or the LED 53 using optical fibers requires that the waveguide slab 11 and the optical device be spaced apart by a sufficient distance to avoid bending the optical fibers beyond their minimum bending radii. The need to accommodate a bundle of optical fibers without exceeding the minimum bending radii thereof, in general, requires that the waveguide slab 11 and the optical device be spaced apart by a substantial distance. Applicants have eliminated this restriction by devising a system that can operate with a minimal number of optical fibers between the waveguide slab 11 and the LED 53, and between the waveguide 11 and the PMT 78.

Hence, the overall dimensions of the system 10 are compact in relation to a comparable system that requires the use of relatively large bundles of optical fibers. The system 10 is thus particularly well suited for use in space-limited applications such as aircraft fuel tanks. Moreover, the design of the lens housing 30 further contributes to the compactness of the system 10 by permitting the fiber optic cable 72 to be routed sideways, i.e., horizontally. This arrangement, in general, is better suited for compact spaces than an arrangement in which the cable 72 is routed vertically, i.e., extending upward from the top of the tank 12.

The system 10 also possesses the substantial advantages associated with the use of optical detectors to measure fluid levels. For example, the electrical components of the system 10 are located outside of and away from the tank 12. Hence, the potential for the electrical components of the system 10 to ignite a flammable mixture within the tank 12 is virtually non-existent.

Furthermore, the optical signals carried by the optical fibers 55a, 72a are immune to the effects of electromagnetic interference. The system 10 also has lower power requirements that conventional capacitance-type fluid-level transmitters of similar capability, and does not require the relatively complex calibration process that such transmitters must routinely undergo. Furthermore, the system 10 has no moving parts, thus providing potential advantages relating the reliability and maintainability. Moreover, the system 10 operates on a substantially passive basis once activated.

It is to be understood that even though numerous characteristics and advantages of the present invention have been set forth in the foregoing description, the disclosure is illustrative only and changes may be made in detail within the principles of the invention to the full extent indicated by the broad general meaning of the terms in which the appended claims are expressed.

Figure 15:
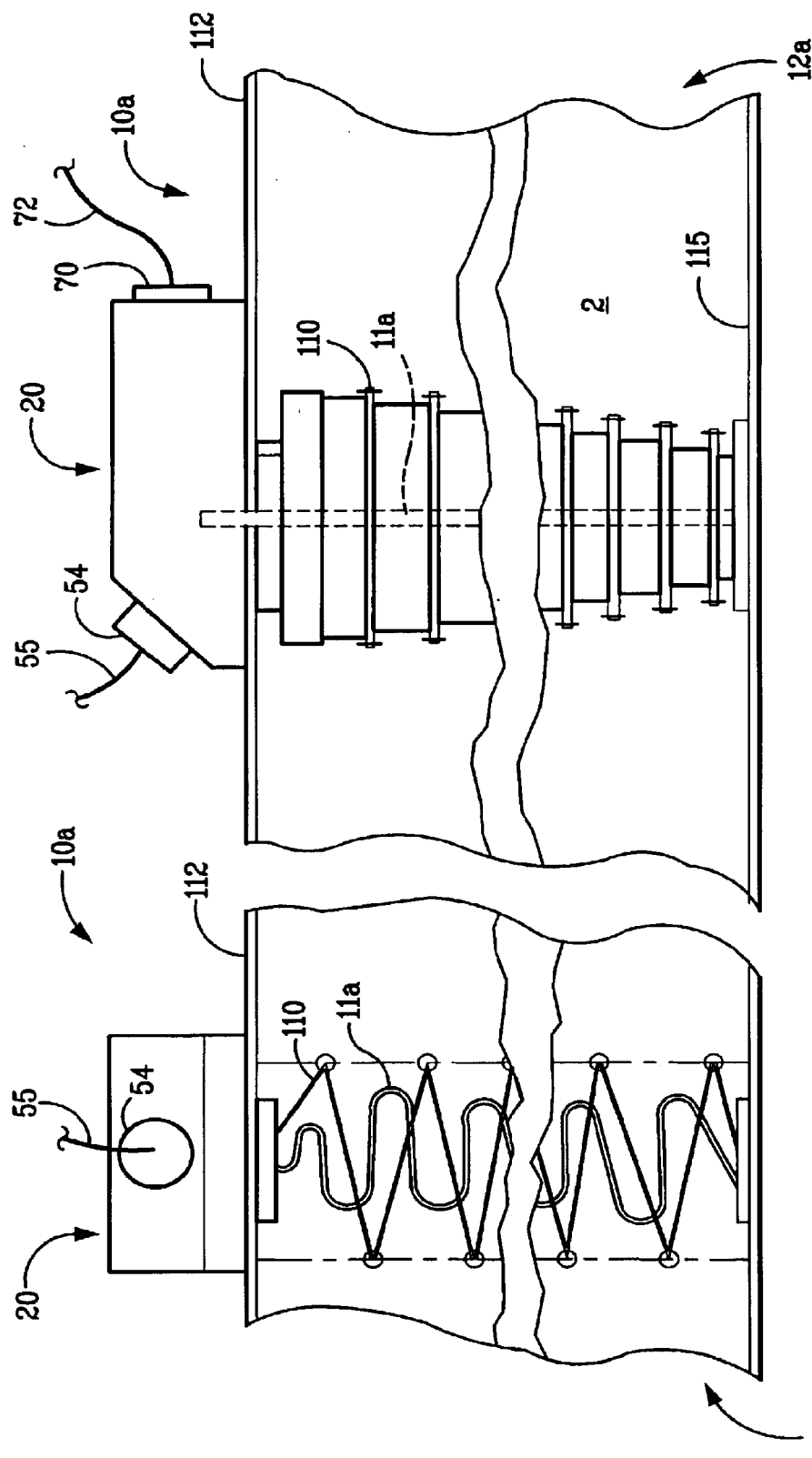
FIG. 15A is a side view of an alternative electro-optic fluid quantity measurement system.
FIG. 15B is a side view of the electro-optic fluid quantity measurement system depicted in FIG. 15A, rotated approximately ninety degrees from the perspective of FIG. 15A.

For example, FIGS. 15A and 15B depict an alternative electro-optic fluid quantity measurement system 10a. The system 10a is adapted for use with a collapsible tank 12a A top panel 112 of the tank 12b is adapted to move downwardly as the volume of fluid within the tank 12a decreases. The system 10a comprises a flexible waveguide slab 11a configured in a serpentine pattern, as shown in FIG. 15A. The waveguide slab 11a is preferably formed from an inorganic polymeric material such as fluorinated acrylate.

The waveguide slab 11b is mounted within a supporting structure 110 secured the top panel 112 and a bottom panel 115 of the tank 12a. The supporting structure 110 is rigid, and is adapted to contract and expand in an accordion-like manner as the top panel 112 moves downwardly and upwardly in response to changes in the volume of fluid within the tank 12a The system 10a is otherwise substantially identical to the above-described system 10 (components of the system 10a that are substantially identical to those of the system 10 are denoted by common reference numerals in the figures).

The serpentine configuration of the waveguide slab 11a, in conjunction with the supporting structure 112, allow the overall height, i.e., vertical dimension, of the waveguide slab 11a to vary as the top panel 112 moves upwardly and downwardly. The serpentine configuration of the waveguide slab 11a and the supporting structure 110 also permit the waveguide slab 11a to undergo variations in height without kinking, i.e., without impending the ability of the waveguide slab 11a to transmit light).

Figure 16:
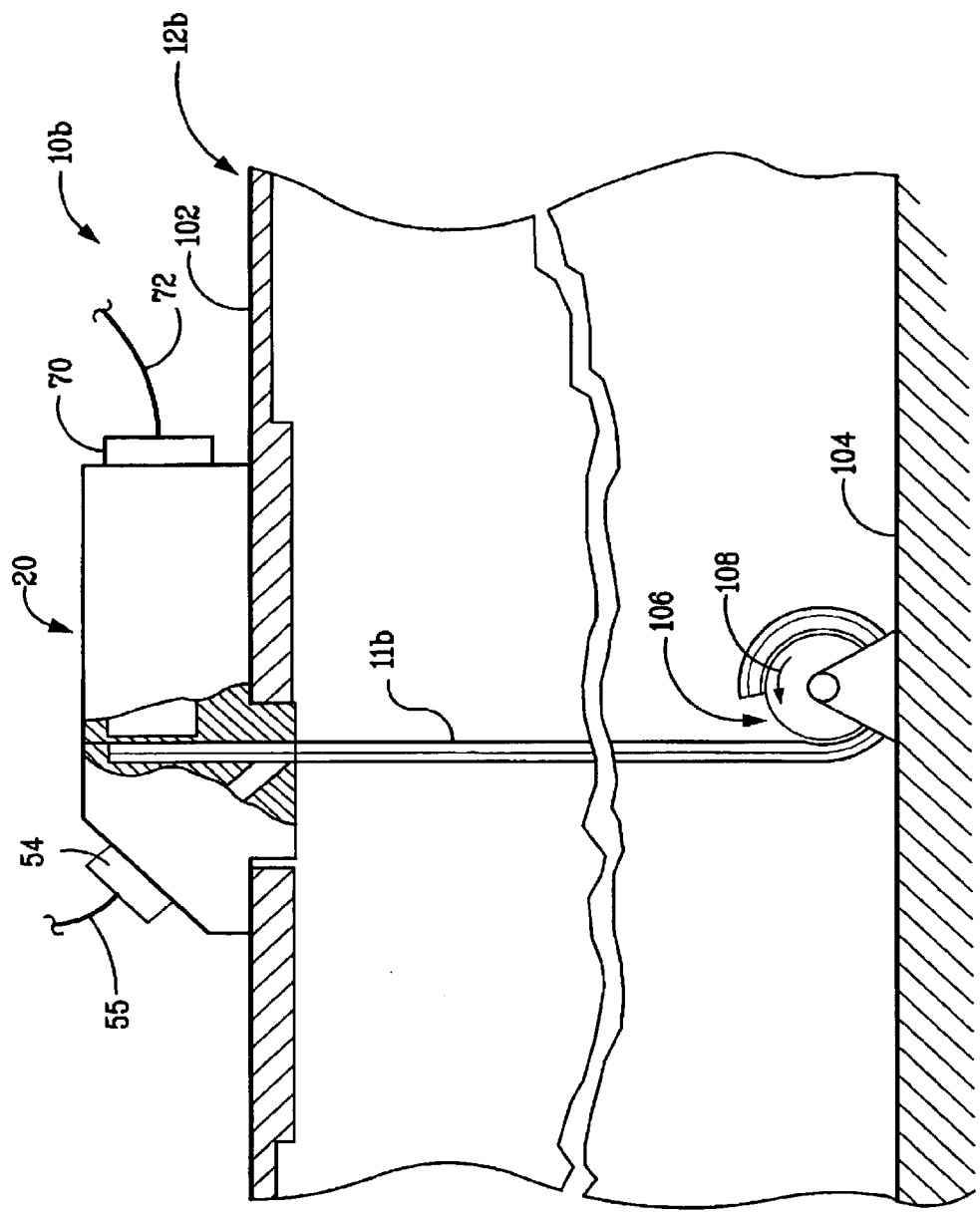
FIG. 16 is a side view of another alternative electro-optic fluid quantity measurement system.

FIG. 16 depicts another alternative electro-optic fluid quantity measurement system 10b. The system 10b is adapted for use with a collapsible tank 12b. A top panel 102 of the tank 12b is adapted to move downwardly as the volume of fluid within the tank 12a decreases. The system 10b comprises a flexible waveguide slab 11b. The waveguide slab 11b is preferably formed from an inorganic polymeric material such as fluorinated acrylate.

The system 10b also comprises a negator spring 106 mounted on a base 104 of the tank 12b, and secured to a lower end of the waveguide slab 11b. The system 10b is otherwise substantially identical to the above-described system 10 (components of the system 10b that are substantially identical to those of the system 10 are denoted by common reference numerals in the figures).

The negator spring 106 is biased in a counterclockwise direction (as denoted by the arrow 108 in FIG. 16). The bias of the negator spring causes the waveguide slab 11b to remain in tension as the top panel 102 moves downward in response to changes in the volume of fluid within the tank 12b. Moreover, the waveguide slab 11b wraps around the negator spring 106 as the top panel 102 moves downward, thereby allowing the height of the waveguide slab 11b to decrease without the waveguide slab 11b becoming kinked.

Furthermore, the specific spectral ranges of light specified herein are presented for exemplary purposes only. Alternative embodiments may utilize light (electromagnetic radiation) within other spectral ranges, including ranges beyond the range of visible light. Also, the system 10 comprises separate fiber optic cables 55, 72 to transmit optical signals between the LED 53 and the collimating lens assembly 54, and between the PMT 76 and the output connector assembly 70. These signals may, in the alternative, be transmitted using a single duplex cable housing both the optical fiber 55a and the optical fiber 72a, or using optical conductors other than cables. Moreover, alternative embodiments of the system 10 may comprise more than one of the optical fibers 55a and more than one of the optical fibers 72a

What is claimed is:

1. A system for measuring a level of a first fluid in a volume adapted to hold the first fluid and a second fluid located substantially above the first fluid and having a refractive index different than a refractive index of the first fluid, comprising:

a light source adapted to produce light of a first wavelength;

an elongated optical waveguide slab in optical communication with the light source and adapted to be immersed in the first and second fluids, the optical waveguide slab comprising a material adapted to emit light of a second wavelength when exposed to the light of the first wavelength and having a reflective surface oriented at an acute angle in relation of a longitudinal axis of the optical waveguide slab;

a waveguide housing mechanically coupled to the optical waveguide slab and being adapted to direct the light of the first wavelength into the optical waveguide slab at a selectively-variable angle so that (i) a substantial entirety of the light of the first wavelength is internally reflected within a portion of the optical waveguide slab located above the interface of the first and second fluids and (ii) a substantial entirety of the light of the first wavelength is transmitted into the first fluid from a portion of the optical waveguide located below the interface of the first and second fluids; and a photo-multiplier tube optically communicating with the optical waveguide slab and adapted to generate an electrical output in response to the light having the second wavelength.

2. The system of claim 1, wherein the reflective surface is oriented at an angle of approximately 45 degrees in relation of a longitudinal axis of the optical waveguide slab.

3. The system of claim 1, further comprising an optical fiber mechanically coupled to the light source and the waveguide housing and being in optical communication with the light source and the optical waveguide slab.

4. The system of claim 3, further comprising a light pipe, wherein the waveguide housing has a through hole formed therein and the through hole is adapted to receive the light pipe so that the light pipe is in optical communication with the optical fiber and the optical waveguide slab.

5. The system of claim 4, further comprising a collimating lens in optical communication with the light source and mechanically coupled to the optical fiber, wherein the waveguide housing has a bore formed therein and adjoining the through hole, the bore being adapted to receive at least a portion of the collimating lens assembly.

6. The system of claim 4, wherein a position of an end of the optical fiber is selectively variable in relation to the light pipe.

7. The system of claim 1, further comprising a filter in optical communication with the optical waveguide slab and the photo-multiplier tube, wherein the filter is adapted to substantially block the passage of the light of a wavelength other than the second wavelength.

8. The system of claim 7, further comprising a lens in optical communication with the filter.

9. The system of claim 8, further comprising a lens housing mechanically coupled to the waveguide housing and having a passage formed therein, the passage being adapted to receive the lens and the filter.

10. The system of claim 9, further comprising an output connector assembly at least partially disposed in the passage, and an optical fiber mechanically coupled to the output connector assembly and the photo-multiplier tube.

11. The system of claim 10, wherein the lens is adapted to focus the light of the second wavelength on an end of the optical fiber.

12. The system of claim 1, further comprising a means for processing the electrical output of the photo-multiplier tube.

13. The system of claim 1, wherein the light source is a lighted electronic diode.

14. The system of claim 10, wherein a position of an end of the optical fiber is selectively variable in relation to the lens.

15. The system of claim 10, wherein the system comprises not more than one of the optical fibers mechanically coupled to the output connector assembly and the photo multiplier tube.

16. The system of claim 10, wherein the system comprises not more than one of the optical fibers mechanically coupled to the light source and the waveguide housing and being in optical communication with the light source and the optical waveguide slab.

17. The system of claim 10, wherein the output connector assembly is selectively positionable within the lens housing so that a distance between the lens and the end of the optical fiber is selectively variable.

18. The system of claim 1, further comprising a second reflective surface located at a bottom of the optical waveguide slab.

19. The system of claim 1, further a means for dampening vibration of the optical waveguide slab.

20. The system of claim 1, wherein the reflective surface forms part of a mirror.

21. The system of claim 3, further comprising a fiber-optic cable comprising the optical fiber.

22. The system of claim 10, further comprising a fiber-optic cable comprising the optical fiber.

23. A system for measuring a level of a fluid, comprising:
a light source adapted to generate light having a predetermined wavelength;
an optical waveguide slab at least partially filled with a material adapted to fluoresce when illuminated by the light having a predetermined wavelength;
a first optical fiber in optical communication with the light source;
a waveguide housing mechanically coupled to the first optical fiber;
a light pipe mounted in the waveguide housing and being in optical communication with the first optical fiber, the light pipe being adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid;
a second optical fiber mechanically coupled to the photo-multiplier tube and in optical communication with the optical waveguide slab; and
a photo-multiplier tube in optical communication with the optical waveguide slab and adapted to generate an electrical output in response to the fluorescence of the fluorescent material.

24. The system of claim 23, wherein the waveguide housing is adapted to facilitate selective variation of a distance between an end of the first optical fiber cable and the optical waveguide slab.

25. The system of claim 23, further comprising a lens housing mechanically coupled to the waveguide housing and the second optical fiber, wherein the lens housing is adapted to facilitate selective variation of a distance between the optical waveguide slab and an end of the second optical fiber.

26. The system of claim 24, wherein the optical waveguide housing has a reflective surface therein, the reflective surface being adapted to reflect the fluorescence in a direction substantially perpendicular to a longitudinal axis of the optical waveguide tube.

27. The system of claim 26, wherein the reflective surface forms part of a mirror.

28. The system of claim 23, wherein the system comprises not more than one of the first optical fibers and not more than one of the second optical fibers.

29. A system for measuring a level of a fluid, comprising:
a light source adapted to generate light having a predetermined wavelength;
an optical waveguide slab at least partially filled with a material adapted to fluoresce when illuminated by the light having a predetermined wavelength;
a first optical fiber in optical communication with the light source;
a waveguide housing mechanically coupled to the first optical fiber;
a light pipe mounted in the waveguide housing and being in optical communication with the first optical fiber, the light pipe being adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid; and an optical detector in optical communication with the optical waveguide slab and adapted to generate an electrical output in response to the fluorescence of the fluorescent material, wherein the waveguide housing is adapted to facilitate selective variation a distance between an end of the first optical fiber and the optical waveguide slab.

30. The system of claim 29, further comprising (i) a second optical fiber mechanically coupled to the photomultiplier tube and in optical communication with the optical waveguide slab and (ii) a lens housing mechanically coupled to the waveguide housing and the second optical fiber, wherein the lens housing is adapted to facilitate selective variation of a distance between the optical waveguide slab and an end of the second optical fiber.

31. The system of claim 20, wherein the optical waveguide housing has a reflective surface therein, the reflective surface being adapted to reflect the fluorescence in a direction substantially perpendicular to a longitudinal axis of the optical waveguide tube.

32. The system of claim 31, wherein the reflective surface forms part of a mirror.

33. The system of claim 30, wherein the system comprises not more than one of the first optical fibers and not more than one of the second optical fibers.

34. A system for measuring a level of a fluid in a collapsible tank having a top cover adapted to translate upwardly and downwardly in response to variations in the level of the fluid in the tank, and a base, comprising:

a light source adapted to generate light having a predetermined wavelength;

an optical waveguide slab at least partially filled with a material adapted to fluoresce when illuminated by the light having a predetermined wavelength, the optical waveguide being flexible and having a substantially serpentine configuration;

a supporting structure for the optical waveguide slab, the supporting structure being mechanically coupled to the top cover and the base and being adapted to expand and contract in response to upward and downward movement of the top cover;

a first optical fiber in optical communication with the light source;

a waveguide housing mechanically coupled to the first optical fiber;

a light pipe mounted in the waveguide housing and being in optical communication with the optical fiber, the light pipe being adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid;

a second optical fiber mechanically coupled to the photomultiplier tube and in optical communication with the optical waveguide slab; and an optical detector in optical communication with the optical waveguide slab and adapted to generate an electrical output in response to the fluorescence of the fluorescent material.

35. A system for measuring a level of a fluid in a collapsible tank having a top cover adapted to translate upwardly and downwardly in response to variations in the level of the fluid in the tank, and a base, comprising:

a light source adapted to generate light having a predetermined wavelength;

a flexible optical waveguide slab at least partially filled with a material adapted to fluoresce when illuminated by the light having a predetermined wavelength;

a negator spring mechanically coupled to the optical waveguide slab and the base and biasing the optical waveguide slab so that a portion of the optical waveguide slab between the negator spring and the top cover remains in tension as the top cover translates upwardly and downwardly;

a first optical fiber in optical communication with the light source;

a waveguide housing mechanically coupled to the first optical fiber;

a light pipe mounted in the waveguide housing and being in optical communication with the first optical fiber, the light pipe being adapted to transmit the light having a predetermined wavelength to the optical waveguide slab at an angle that causes the light having a predetermined wavelength to be internally reflected only within a portion of the optical waveguide slab located above the fluid thereby illuminating the fluorescent material within the portion of the optical waveguide slab located above the fluid;

a second optical fiber mechanically coupled to the photomultiplier tube and in optical communication with the optical waveguide slab; and an optical detector in optical communication with the optical waveguide slab and adapted to generate an electrical output in response to the fluorescence of the fluorescent material.

\* \* \* \* \*